United States Patent

Inose

[15] 3,706,262
[45] Dec. 19, 1972

[54] POWER STEERING MECHANISM
[72] Inventor: Hideo Inose, Kariya, Japan
[73] Assignee: Aisin Seiki Kabushiki Kaisha, Aichi Pref., Japan
[22] Filed: Nov. 25, 1970
[21] Appl. No.: 92,752

[30] Foreign Application Priority Data

Nov. 27, 1969 Japan ..............................44/95572
Nov. 27, 1969 Japan ..............................44/95573

[52] U.S. Cl.....................................91/378, 96/136
[51] Int. Cl.................................................F15b 9/10
[58] Field of Search........91/380, 378, 382, 422, 376; 92/136

[56] References Cited

UNITED STATES PATENTS

| | | | |
|---|---|---|---|
| 2,954,837 | 10/1960 | Ziskal | 91/380 |
| 3,012,543 | 12/1961 | Sheppard | 92/136 |
| 3,602,101 | 8/1971 | Jablonsky | 91/422 |

Primary Examiner—Paul E. Maslousky
Attorney—Sughrue, Rothwell, Mion, Zinn and Macpeak

[57] ABSTRACT

This invention relates to a vehicle wheel power steering mechanism, especially to one having a reciprocal piston member of the type in which a control spool valve means is fitted within the body of the piston member.

The improvement comprises an arrangement in which the valve means is connected hydraulically with a liquid supply and discharge means arranged outside of the mechanism proper, and with hydraulic operating chambers formed at both ends of a main operating piston contained within a cylinder bore of the mechanism proper for slidably receiving said piston. The valve means is fitted within the body of said piston, and a motion multiplier for magnifying the transmitting movement of a threaded member movable in response to a spindle upon manual actuation of a vehicle steering wheel to said valve means is also fitted in a space formed within said piston.

7 Claims, 6 Drawing Figures

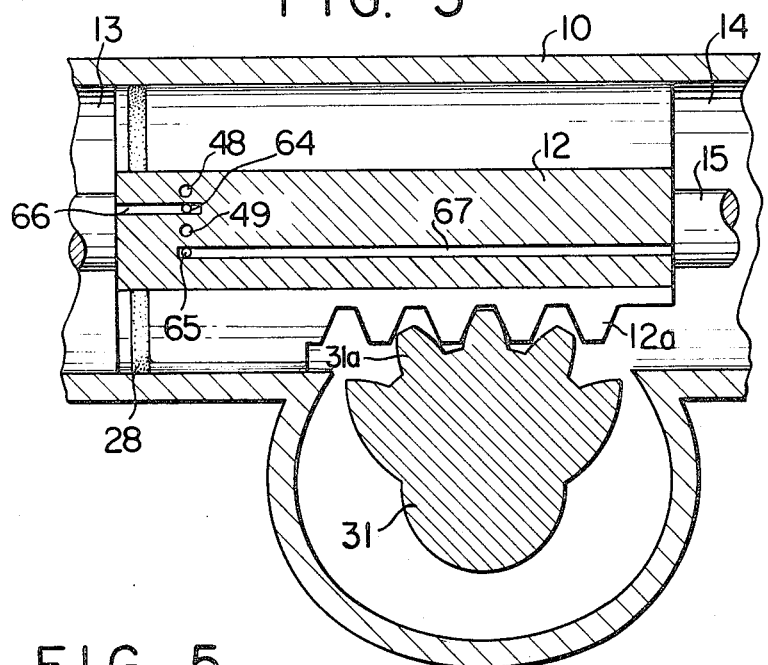
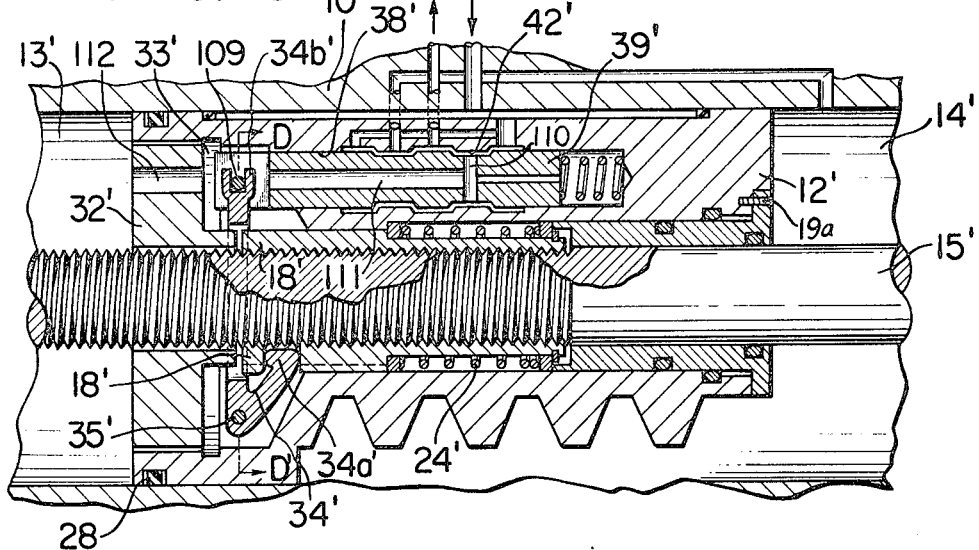
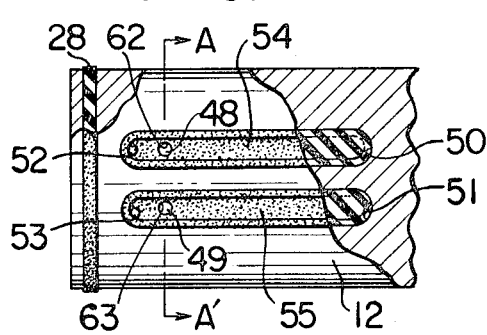
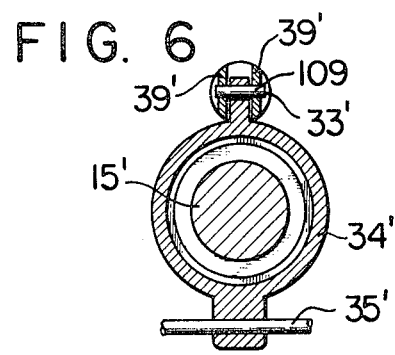

3,706,262

POWER STEERING MECHANISM

This invention relates to a vehicle wheel power directioning or steering mechanism, especially one having a reciprocatable piston member of the integral type which control spool valve means is fitted within the body of the piston member.

In the representative conventional design of this kind of wheel steering mechanism, the reciprocatable piston member is fitted therein with a screw member which is kept in mesh with corresponding screw threads formed on the end of a shaft which is operatively connected with the conventional steering handle. In this conventional automotive wheel steering mechanism of the integral type, said filled-in-type screw member and the related part of said piston are formed with respective cooperable grooves, so as to act in combination as a fluid passage switching valve means for control of the operation of the hydraulic circuits contained in the power steering mechanism. Experience has shown, however, that only an insufficient movable stroke can be realized when reliance is made upon the movement of the said screw member which is kept in threaded mesh with threads formed on the shaft or spindle, said movement being naturally derived from the manual steering effort exerted by the vehicle driver upon the steering handle. Therefore, it is necessary to magnify the movement of the screw member for sufficient motion necessary for successful steering operation.

For this magnifying purpose, said kind of control valve means and a motion-magnifying lever are provided at a certain selected place outside of the main body of the power steering mechanism, or alternatively, they are mounted on a cover or the like member of said main body of the mechanism.

This proposed arrangement has, however, invited a substantial increase of the overall dimensions of the mechanism; a difficulty in the assembling of the motion-magnifier to the power steering mechanism; a substantial increase of manufacturing cost thereof; and a substantially higher additional power loss caused by the unavoidable lengthy arrangement of the hydraulic pipings on and in the mechanism as a whole.

A main object of the present invention is to provide a vehicle wheel power steering mechanism capable of obviating substantially the aforementioned conventional drawbacks.

A further object of the invention is to provide a power steering mechanism of the kind above referred to wherein the control spool valve, the rotatable shaft or spindle-controlled screw member and a motion-magnifier provided for the latter are all arranged within the body of the hydraulic piston.

A still further object is to provide a power steering mechanism wherein effective seal can be assured in liquid supply and liquid discharge pipings extending from a pump means and a liquid reservoir arranged outside of the movable hydraulic piston contained in the mechanism to and from the spool valve means provided in the body of the movable piston.

These and further objects, features and advantages of the invention will become more apparent when read the following detailed description of the invention by reference to the accompanying drawings, illustrative substantially an embodiment thereof and several modifications thereto.

In the drawings:

FIG. 3 is a partial sectional view taken substantially along a section line C–C' shown in FIG. 2 and drawn on a slightly smaller scale.

FIG. 4 is a partially sectioned side view of a part of the piston shown in the forgoing figures.

FIG. 5 is a substantially similar view to FIG. 1, showing only the essential parts of a modification from the embodiment shown in the foregoing figures.

FIG. 6 is a cross-sectional view taken substantially along a section line D–D' shown in FIG. 5.

Referring now to the accompanying drawings, substantially a preferred embodiment of the power steering mechanism adapted for use with a powered and wheeled vehicle embodying the novel teachings of the invention will be described in detail.

Figure 1:
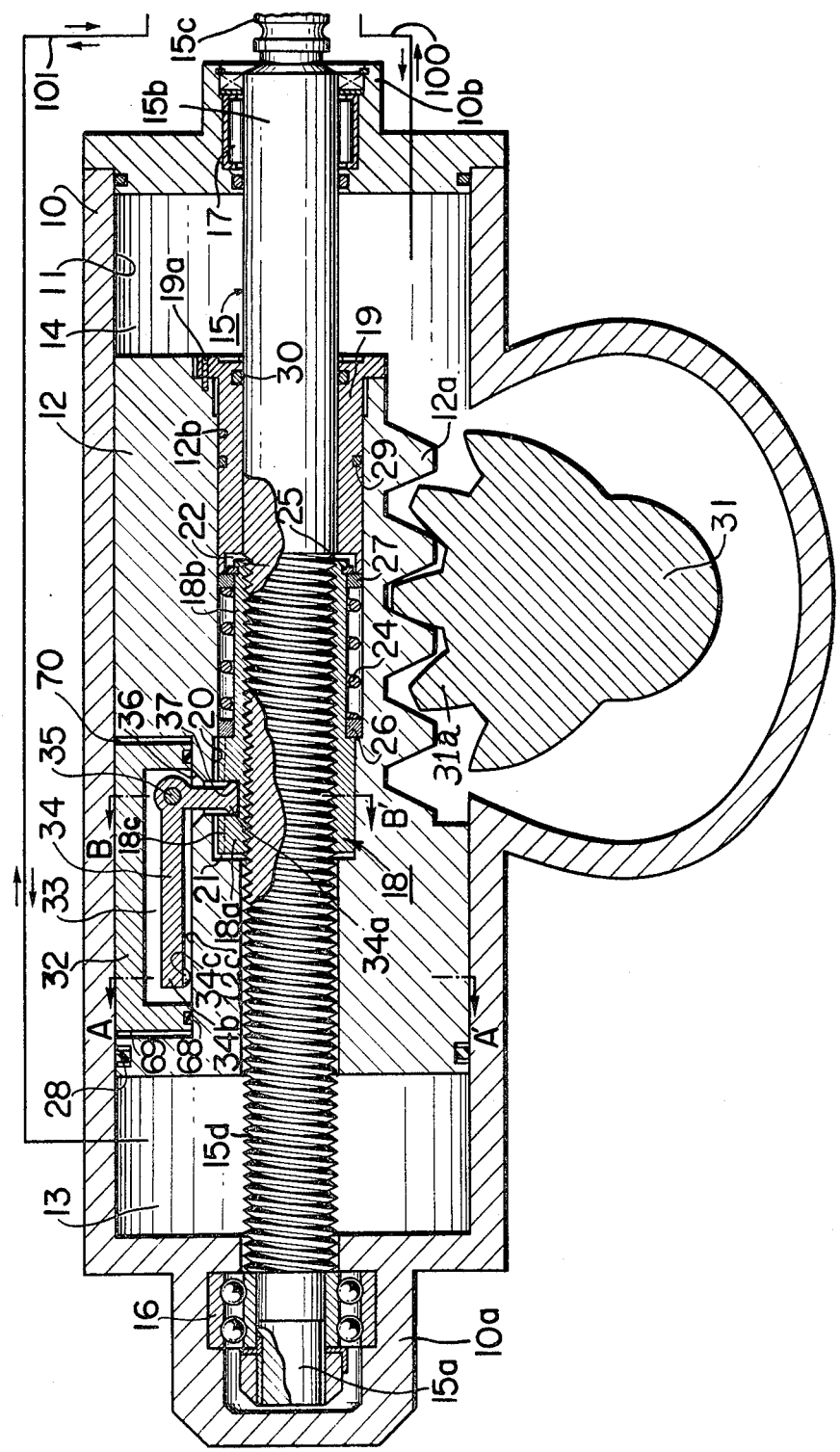
FIG. 1 is a substantially axial sectional view of essential parts of a preferred embodiment of the power steering mechanism according to this invention.

In FIG. 1, numeral 10 denotes a hollow main body in which a cylindrical inside space 11 is formed. A piston member 12 is mounted slidably in the space 11 and defines the space into two separated hydraulic chambers 13 and 14. An elongated shaft 15 extends in the axial direction of the main body 10 and passes through the piston member 12, the both ends 15a and 15b of the shaft being rotatably mounted by respective antifriction bearings 16 and 17 which are mounted in pockets 10a and 10b forming part of the main body 10 as seen, respectively. The right-hand end 15b of shaft 15 has a reduced extension 15c which is mechanically connected to a conventional steering handle, not shown, of the wheeled vehicle for receiving a manual steering effort of the driver in the form of a turning torque. The shaft 15 is formed along a substantial length thereof with left-handed male screw threads 15d with which an inner bore correspondingly threaded and sleeve 18 having an outer stepped configuration is kept in mesh. This sleeve 18 is slidably received in a blind axial bore 12b formed in the piston member 12. A further plain bushing 19 is also received in said bore 12b and attached fixedly to the piston member by means of fixing screws 19a or the like conventional fixing means as shown in FIG. 1.

The stepped sleeve 18 consists of a larger diameter part 18a and a smaller diameter part 18b made integral therewith, an axially extending rib 18c being formed on the outer periphery of said larger part 18a and in engagement with an axial groove 20 formed in the wall surface of bore 12b along a limited length, for providing means for the prevention of any turning movement of the first sleeve 18 relative to the piston member 12. At both ends of first sleeve 18, respective spaces 21 and 22 are formed in the bore 12b for the purpose to be described hereinafter. A coil spring 24 is inserted under compression between the inner end of the larger sleeve part 18a and a snap ring 25 through respective retainers 26 and 27, said snap ring being detachably fixed on the smaller sleeve part 18b.

A sealing ring 28 is mounted on the outer periphery of piston member 12 for assuring a sealing and slidable cooperation between the piston and the cylinder 10. Second sleeve 19 is provided with an outer sealing ring 29 and an inner sealing ring 30 as shown for assuring effective seal on the outer and inner peripheral surface relative to their respectively adjacent parts, especially for avoiding fluid leakage from the related hydraulic chambers 13 and 14. Piston member 12 is formed with rack teeth 12a which are kept in meshing with a segmental gear 31. The piston is further formed with a substantially crescent-shaped recess 12c in which a recessed cover member 32 is sealingly received, so as to form a space 33 defined by said cover and piston. A sealing member 68 is provided between said cover and piston.

Figure 2:
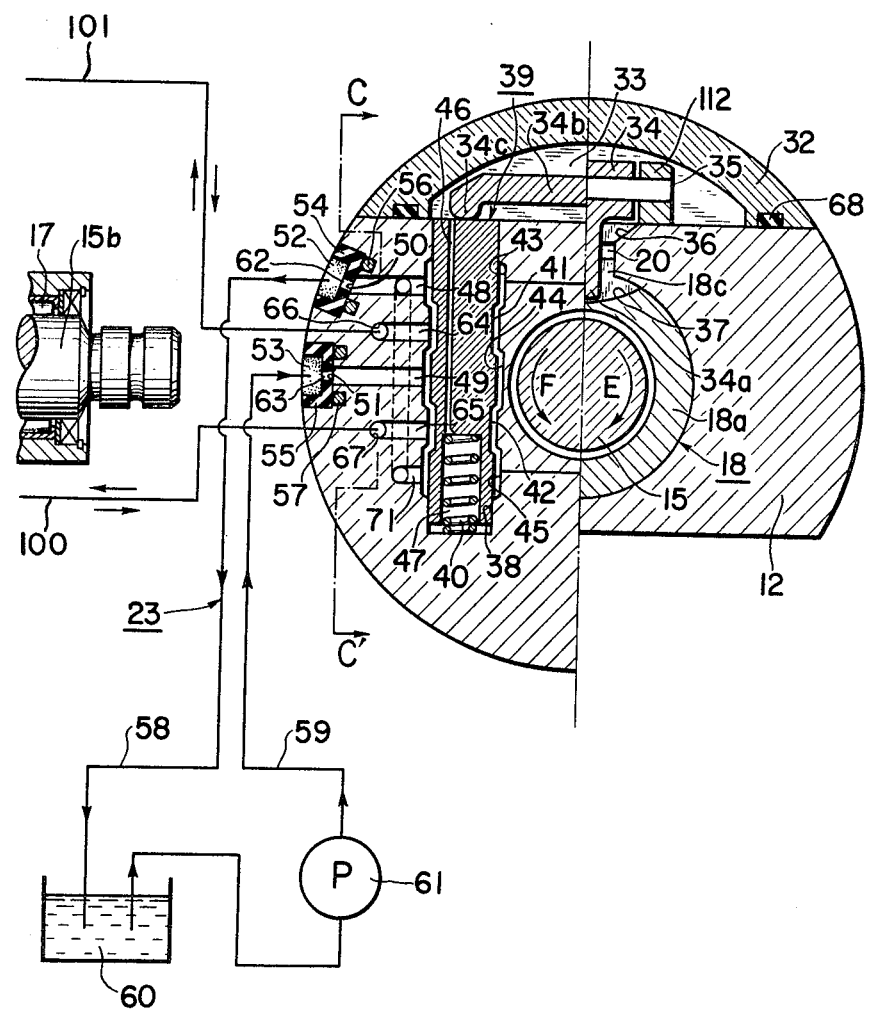
FIG. 2 is a combined cross-sectional view represented on a slightly larger scale, the left half and the right half being taken along section lines A–A' and B–B' shown in FIG. 1, respectively, the remaining halves being symmetrical to those shown, wherein liquid reservoir, liquid supply pump and related pipings are shown schematically and additionally.

A pair of mounting members 112 are fixedly attached to the piston 12 by the conventional fixing means such as welding, screwing or the like, although not shown and only one of them is shown at the right-hand part of FIG. 2 only for simplicity. Under circumstances, however, these mounting members may be in the form of outwardly and laterally extending projections made integral with the body of piston 12 and provided within the said recess 12c. A pivot pin 35 is mounted fixedly in form of a bridge between the mounts 112, so as to mount pivotably in turn a bell crank lever 34. The shorter arm 34a passes loosely through a lateral opening 36 formed through the corresponding part of piston 12, and projects into a lateral recess 37 formed on the larger sleeve part 18a. The larger arm 34b of bell crank lever 34 is kept by its tip end in contact through an integral projection 34c with value spool 39.

The piston member 12 is formed with a lateral bore 38 in which valve spool 39 is slidably inserted, said spool being backed up from below when seen in FIG. 2 with an urging spring 40, so as to contact with the projection 34c formed on the tip end of the longer lever arm 34b. Valve spool 39 is formed thereon two separated circular grooves 41 and 42 adapted for cooperation with grooves 43 and 44 or 44 and 45, respectively. A fluid communication duct 46 is formed through valve spool 39 for establishing fluid communication between said space 33 and a space 47 formed between the spool 39 and the bottom wall of said bore 38, said spring 40 being arranged within this space 47. A radially extending fluid discharged duct 48 formed in the body of piston member 12 and in fluid communication with the groove 43. An axial duct 71 is branched off at a midpoint of the duct 48 therefrom and kept in fluid communication with the groove 45. These grooves 43 and 45 appearing in the left-half of the cross-section shown in FIG. 2, left, taken along a section line A - A' in FIG. 1 are kept in fluid communication with the similar and corresponding ring grooves 43' and 45', not shown and to appear at the right-hand half of the cross-section A - A', having been omitted from FIG. 2 only for simplicity. Thus, all these grooves 43, 43', 45 and 45' are kept in fluid communication with the discharge duct 48.

A supply duct 49 is formed radially within the body of piston member 12 and kept in fluid communication with the intermediate circular groove 44. A similar groove 44', not shown, is also provided in the omitted right-hand half of the cross-section A-A' from FIG. 2, and kept naturally in fluid communication with said supply duct 49.

Grooves 50 and 51 are also formed within the body of piston member 12 and have their respective highly flattened width larger than the axial stroke of the latter when seen in the axial direction of the piston as may be supposed from the representation in FIG. 4. As seen, discharge duct 48 and supply duct 49 open at these flattened grooves 50 and 51, respectively.

Recessed sealing members 54 and 55 are inserted snugly in the horizontally flattened grooves 50 and 51, respectively and O-rings 56 and 57 are provided for assuring positively sealing effect around these members 54 and 55, respectively. Sealed chambers 52 and 53 are defined by the respective recesses in these members 54 and 55, respectively, and in cooperation with the inside bore wall 11 of the hollow main body or cylinder 10. The sealingly defined chambers 52 and 53 have a common horizontal length longer than the stroke of the piston 12 and kept in fluid communication with ducts 48 and 49 through respective perforations 62 and 63 formed through the bottom wall parts of the member 54 and 55, respectively. Piping 58 connects fluidically the chamber 52 to a reservoir tank 60, while a further piping 59 having a pump 61 extends from the reservoir 60 to the chamber 53, as shown schematically in FIG. 2. Since the piston 12 is movable relative to the main body 10, a proper discharge port, now shown, is provided wall of the main body 10 for establishing fluid communication between the chamber 52 and discharge piping 58. In the similar way, a proper supply port, now shown, is provided through the wall of the main body 10 for establishing fluid communication between supply piping 59 and chamber 53, although not specifically shown for simplicity.

The valve spool 39 is kept at its uppermost end in pressure engagement with the tip end of longer lever arm 34b through the projection 34c, as most clearly be seen from FIG. 2.

Ducts 64 and 65 are formed within the body of piston 12 kept in fluid communication with ring grooves 41 and 42 formed on the valve spool 39, respectively. Duct 64 is kept at its opposite end in fluid communication through a duct 66 formed axially in the body of piston 12 with the hydraulic chamber 13. Duct 65 is kept at its opposite end in fluid communication through an axial duct 67 formed in the body of piston 12 with the hydraulic chamber 14.

The operation of the embodiment so far shown and described is as follows:

It is now assumed that the vehicle travelling along a straight course and thus, steering handle, not shown, is positioned at its neutral position. The right-hand valve spool 39 is so positioned that all the related ducts are kept in fluid communication with their related fluid flowable parts. The half part shown in the left-hand part of FIG. 2 is provided in the assembly equally in the right-hand part of the assembly, but, only for simplicity, the following description will be relied upon such left-hand part of the assembly. Under these conditions, the hydraulic pressure prevailing in the left-hand side hydraulic chamber 13, FIGS. 1 and 3, is equal to that prevailing in the right-hand side hydraulic chamber 14.

At this stage, pressure fluid conveyed from the reservoir 60 through pressure generator or pump 61 and supply piping 59 to sealed chamber 53, thence through duct 49 to ring groove 44, and further to ring grooves 43 and 45. Then, the pressure liquid is collected in discharge duct 48 leading to sealed chamber 52, thence through discharge piping 58 back to the reservoir. The pressure liquid supplied through the pump 61 will circulate through the above-mentioned overall flowing passage without doing practically any work.

When the vehicle driver rotates manually the steering handle in the right-hand or clockwise direction, the shaft 15 will be rotated in the same direction as schematically shown in FIG. 2 by an arrow "E".

By this operation, the female-threaded first sleeve 18 will be moved leftwards in FIG. 1 by threaded engagement with male threads 15d on the shaft 15, against the action of spring 24, the thus created reaction being transmitted through the shaft 15 back to the steering handle as steering feeling for the vehicle driver. By application of a turning effect exerted by the vehicle driver upon the steering handle, exceeding the above mentioned reaction, the bell crank lever 34 is rotated about its pivot 35 clockwise in FIG. 1 so that the valve spool 39 is moved upwards under the action of spring 40 and ring grooves 41 and 41 on the spool and those at 44 and 45 on the bore wall 38 are brought into their flow interrupting position. Therefore, pressure oil supplied through pump 61 through piping 59, chamber 53, perforation 51 and duct 49 is conveyed to circular groove 44, thence through ring groove 42, duct 65 and piping 100 (only schematically shown in FIGS. 1 and 2) to the right-hand chamber 14. Pressure liquid is also conveyed from the duct 65 through duct 67 (FIGS. 1 and 2) to the same chamber 14.

In this way, a hydraulic operating pressure is accumulated in the chamber 14 and the piston 12 is moved hydraulically leftwards in FIG. 1, so as to follow up after the foregoingly carried out leftward movement of first sleeve 18. This movement of piston 12 is transmitted through mutually engaging teeth 12a and 13a to the segmental gear 31 to rotate it counter clockwise in FIG. 1. Since this segmental gear 31 is operatively connected, although not shown on account of its very popularity, with the vehicle front wheel steering device, not shown, the front wheels are directed correspondingly rightwards as desired.

In this case, part of the liquid contained in the left-hand hydraulic chamber 13 will be discharged therefrom through ducts 66 and 64, circular grooves 41 and 43 to duct 50, thence back to the reservoir 60, as was referred to hereinbefore. Part of the liquid will also be discharged from the chamber 13 through piping 101 (FIGS. 1 and 2).

When the steering handle is turned in the left-hand direction, the shaft 15 will be rotated in the counter clockwise direction as shown by small arrow "F" in FIG. 2, the reversed operation will be invited and thus, hydraulic pressure is accumulated in the left-hand chamber 13 and part of the liquid will be discharged from the right-hand chamber 14, and so on, for directioning the front wheels in the left-hand direction as desired.

Should a liquid leakage happen to take place in the hydraulic circuit comprising supply piping 59 and discharge piping 58, on account of pipe cranks or the like cause, and when the steering handle, not shown, is turned to the left or right, as the case may be, so that the first sleeve 18 is moved axially as before against the action of spring 24 until either of end spaces 21 and 22 becomes nil. The spring reaction will be transmitted back to the steering handle as before. With further manipulation of the steering handle in the same rotational direction against the action of spring 24, the further movement of sleeve 18 will be transmitted to piston 12 by direct contact therewith and the vehicle front wheels will be directioned as desired. Thus, in this way, the power steering mechanism can act as a manual type one.

Next, referring to FIGS. 5 and 6, a modification from the foregoing will be described.

Same or similar constituent parts as those employed in the foregoing are denoted with respective same reference numerals each attached with a prime, regardless of occasional minor difference in their physical shape from the foregoing. Thus, a detailed analysis of these same or similar constituent parts may be omitted without prejudice and any sacrifice of better understanding of the nature of the invention.

In the present modification, when the steering handle, not shown, is manipulated by the vehicle driver in the aforementioned sense, resulting in a corresponding axial movement of the first sleeve 18'; motion will be transmitted therefrom to lever arm 34a' of lever 34' so that the latter will be swiveled about its pivot pin 35'.

Since the valve spool 39' is received in the horizontal bore 38' formed in the body of piston member 12' and linked at 109 with the forked lever arm 34b', the valve spool is moved correspondingly leftwards or rightwards in its axial direction depending upon the manipulating direction of the steering handle, for change-off of the liquid communication mode from one to another in the similar way as before.

The valve spool 39' is formed with a radial passage or duct 110 in communication with the annual groove 42' formed thereon, and with an axial passage or duct 111 which is in communication with said radial duct 110 in such a way that the groove 42' communicates the hydraulic chamber 13' through said ducts 110 and 111, the space 33' and an axial passage formed through the cover 32' of piston member 12'.

It will thus be easily understood that the present modification shown in FIGS. 5 and 6 can operate in the similar manner as before.

It may be ascertained from the foregoing disclosure of the main embodiment shown in FIGS. 1–4 as well as the modification therefrom shown in FIGS. 5 and 6, a threaded member shaped in to a first sleeve 18 or 18' and kept in screw meshing with the main operating shaft or spindle 15 or 15' is axially moved depending upon the drivers turning effort exerted on the steering handle and the motion is transmitted to lever means for turning movement thereof and for shifting a valve spool means contained movably in the body of a hydraulic piston, so as to perform a changeoff operation of the hydraulic circuit employed in the power steering mechanism. By adopting such measure as mentioned above, the displacement or shift of the valve spool means can be magnified from the rather small control movement of the said spindle without any appreciable overall dimensional requirements of the power steering mechanism. In this way, the effective or operating areas on the valve spool means which directly concern with said circuit changeoff or control operation of the valve may be considerably increased for attaining more accurate, easy and reliable functions of the steering mechanism. Other conventional drawbacks as were referred to hereinbefore can naturally be obviated as will easily be understood from the foregoing detailed disclosure.

The foregoing embodiment and modification have been shown and described only by way of example. Various changes and modifications may easily occur to any person skilled in the art without departing from the gist and spirit of the appended claims. For instance, axially elongated grooves for reception of recessed sealing means 54 and 55 may be provided in the cylindrical bore wall surface of the main body, in place of the peripheral surface of the main working piston 12 or 12', for providing an axially elongated fluid junctions having an axial length than the piston stroke for leakageless fluid connection with respective liquid supply and discharge pipings as at 59 and 58, respectively.

The embodiment of the invention in which an exclusive property or privilege is claimed are as follows:

1. A power steering mechanism comprising a hollow stationary main body having cylindrical bore formed axially therein, a main spindle rotatable mounted in said main body, said spindle having screw threads formed on the outer periphery along a substantial length thereof, a hydraulic piston slidably mounted in said cylindrical bore concentrically with said spindle, said piston being slidable relative to said spindle, a valve means fitted within said piston and movable relative thereto, a threaded member in mesh with said threads on said spindle for performing reciprocating movement of said threaded member along said spindle upon rotation of said spindle, and a lever means pivotably mounted on said piston, one end of said lever means being operatively connected with said threaded member, the other end of said lever means being operatively connected with said valve means, said one end of said lever means being shorter than said other end of said lever means, two separated hydraulic chambers being formed in said cylindrical bore by said piston, a hydraulic piping system including a hydraulic pressure source and a discharge means connected with said hydraulic chambers for actuation of said piston, said valve means being operatively connected in said piping system, said valve means being arranged for change-off of the hydraulic connecting mode for actuating said piston in either operating direction, the reciprocating movement of said threaded member relative to said piston causing pivotal movement of said lever means to control the movement of said valve means.

2. A power steering mechanism as claimed in claim 1, further comprising a first elongated hydraulic junction chamber formed in the outer peripheral surface of said piston, said junction chamber having a length longer than the stroke of said piston and being hydraulically connected in the fluid supply side of said piping system.

3. A power steering mechanism as claimed in claim 2, further comprising a second elongated hydraulic junction chamber formed in the outer peripheral surface of said piston, said junction chamber having a length longer than the stroke of said piston and being hydraulically connected in the fluid discharge side of said piping system.

4. A power steering mechanism as claimed in claim 2, said junction chamber is formed by a recessed sealing member which is perforated and received in a corresponding recess formed on said piston.

5. A power steering mechanism as claimed in claim 1, wherein said lever means comprises a first arm extending into a recess in the threaded member, and a second arm kept in contact with the valve means at all times, said valve means being urged by a spring provided at the opposite end of said valve means to that which is kept in contact with said second arm.

6. A power steering mechanism as claimed in claim 5, wherein said valve means is positioned radially within the piston, said second arm of said lever means being arranged to move radially relative to said piston under the influence of longitudinal movement of said threaded member.

7. Steering mechanism as claimed in claim 5, wherein said valve means is arranged in the piston and axially relative thereto, said second arm of said lever means being movable axially relative to said piston under the influence of longitudinal movement of said threaded member.

* * * * *